Patented Dec. 1, 1953

2,661,340

UNITED STATES PATENT OFFICE 2,661,340

MANUFACTURE OF CYCLIZED RUBBER

Gerardus Johannes van Veersen, The Hague, Netherlands, assignor to Rubber-Stichting, Delft, Netherlands No Drawing. Application September 8, 1950, Serial No. 183,904

Claims priority, application Netherlands December 31, 1947

6 Claims. (Cl. 260—29.7)

This invention relates to manufacture of cyclized rubber; and it consists of a process of treating aqueous dispersions or latices of unsaturated rubbers, including both natural rubber latex and artificial latices of synthetic unsaturated rubbers, by first stabilizing such a latex by the addition thereto of a small amount of a cationic surface active agent, capable of stabilizing the latex in the presence of concentrated sulfuric acid, adding sufficient sulfuric acid to produce a concentration within the range of about 60 to 90 per cent by weight and maintaining the mixture at a temperature producing cyclization until a substantial degree of cyclization of the rubber is obtained; all as more fully hereinafter set forth and as claimed.

This is a continuation-in-part of my copending application, Serial No. 59,190, filed November 9, 1948. In this prior application the process of the present application was disclosed and originally claimed. This subject matter is being divided out of the parent application by the filing of the present application. Several specific examples have been added to the original disclosure.

The principal object of the present invention is to provide a method for the production of cyclized rubber from aqueous dispersions of rubber. Another object of the invention is to provide a process for the preparation of cyclized rubber which does not require the use of solvents during cyclization. A further object of this invention is to provide a procedure for the preparation of cyclized rubber from which aqueous dispersions of cyclized rubber may be obtained readily. Other objects of this invention include the provision of a rapid and economical process for the manufacture of cyclized rubbers and aqueous dispersions thereof.

It is well known that rubber, in the form of sheet, crepe or reclaimed rubber, can be converted into cyclized rubber by milling with sulfuric acid or a sulfonic acid (e. g. p-toluenesulfonic acid) and heating the mixture (e. g. 8 hours at 120° C.). Cyclization also has been obtained by similar treatment of rubber with aluminum chloride, compounds of boron and fluorine (e. g. $HBF_4$ and $H_2B_2O_4 \cdot 6HF$), ferric chloride, stannic chloride, zinc chloride, acids and phenols, phosphorus pentachloride and acid salts (e. g. alum) or diazophenylboron tetrafluoride. The cyclized rubbers so produced are generally dark colored and not very soluble in the usual rubber solvents.

Cyclized rubber has been prepared also by dissolving rubber in a solvent (e. g. benzene, toluene, xylene, mineral spirits, naphtha or white spirits) and heating the solution in the presence of cycling agents such as sulfuric acid, sulfonic acids, hydrogen fluoride, stannic chloride, boron trifluoride, aluminum chloride, zinc chloride, perchloric acid, acid anhydrides, acid chlorides, hydrogen chloride, orthophosphoric acid, orthoboric acid, trichloracetic acid or phosphorus pentoxide and a phenol. The cyclized rubber so prepared is usually a light-colored powder which is soluble in most of the usual rubber solvents.

The above processes suffer from the fact that the cyclizing agent is very difficult to remove from the cyclized rubber and/or from the fact that the processes are costly. It has long been a desideratum in the art to develop a method free from these disadvantages and preferably capable of producing cyclized rubber directly from latex in finely divided form.

I have discovered that it is possible to cyclize latices of unsaturated rubbers by the simple procedure of adding an acid-stable cationic surface active agent in quantity to stabilize the latex against coagulation by concentrated sulfuric acid, adding sufficient sulfuric acid to produce a concentration within the range of from about 60 to 90 per cent by weight and then heating if necessary to produce the desired cyclization. This procedure produces a dispersion of cyclized rubber in concentrated sulfuric acid from which the cyclized rubber can be readily recovered in finely divided form.

I have found that my process is operative with any cationic surface active agent which is stable in the presence of concentrated sulfuric acid. By this expression I do not mean necessarily that the surface active agent is non-reactive with sulfuric acid but only that it retains or exhibits its stabilizing or emulsifying properties in the presence of concentrated sulfuric acid. Many cationic surface active agents or cationic soaps, as they are frequently called, are substituted amonium salts of various strong acids and, of course, in the presence of concentrated sulfuric acid many of the salts are converted into the corresponding sulfates or acid amides without losing their surface activity. And in the case of some compounds, such as those in which the nitrogen atom is substituted with an alkylol group or groups, the compounds may be converted by the sulfuric acid into an ester or other acid derivative, still without losing their stabilizing power.

Cationic soaps can be defined as soaps the active principle (containing the hydrophobic fatty acid derivative) of which is positively charged and forms part of the cation, in contradistinction to ordinary soaps which are the sodium salts of fatty acids and in which the fatty acid radical is the anion. The fatty acid residue produces the colloidal effect in both types of soaps.

Among the cationic soaps may be mentioned salts of quaternary ammonium bases, having a formula selected from the group consisting of

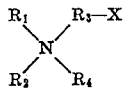

and

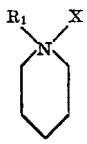

in which $R_1$ is a member of the group consisting of the alkyl, alkylol, aralkyl and aryl-alkylol radicals having more than 12 carbon atoms; $R_2$, $R_3$ and $R_4$ are members of the group consisting of hydrogen and the lower alkyl, aralkyl, aryl and heterocyclic radicals, including derivatives of these groups, such as alkyl sulphonate, alkylamine and alkylol radicals, which tend to increase the solubility in water of the quaternary ammonium salt, and X is a member of the group consisting of the anions of water-soluble acids.

Examples of suitable cationic emulsifiers are the bromide or chloride of the N-cetyl pyridinium-ion commercially available under the tradename "Fixanol"; the acetate or metho-sulfate of (dialkylamino ethyl)-fatty acid amides, known under the trade name "Sapamine"; and the alkali salts of methyl-oleylamide-ethylsulfate, known under the trade-name "Igepon T." Others are the oleamide and stearamide of aminoethylethanolamine and the cocoanut oil fatty acid amides of mono- and di-ethanolamine. In general, every organic nitrogen compound, in which the nitrogen atom has a coordination number of 4, which is water-soluble, and where at least one of the substituents attached to the nitrogen atom contains a long chain hydrocarbon group and which is acid-stable in the sense given above, is a suitable stabilizer in the process of my invention.

It is almost impossible completely to describe the commercial synthetic surface active agents by naming a single chemical compound since in nearly every case the materials sold constitute a complex reaction mixture of several compounds produced in the chemical reactions by means of which they are produced. Reference can be made to "Soap and Sanitary Chemicals," August, September and October 1949 and to the booklet entitled "Synthetic Organic Chemicals United States Production and Sales of Surface-Active Agents, 1948," published by the U. S. Tariff Commission, Washington, D. C., for lists of other cationic surface active agents which are useful in my process. All of these agents are operative which have the properties set out above.

The concentration of cationic surface-active agent required to stabilize the latex depends largely upon the emulsifying power of the particular agent used. The usual range of concentrations is from about 1.5 to 10 per cent. By reason of economy and of the undesirable properties which may be caused in the final product by the presence therein of stabilizing agents, I prefer to use those stabilizing agents which are highly effective emulsifying agents and can produce the desired stabilizing effect when used in very small quantities.

It should be mentioned that acid latices, which have been produced in the prior art by the use of such dispersing agents as saponin, hemoglobin, casein, glyorrhyzin salts etc., are stable toward acids only up to concentrations of about 3 N, whereas the minimum acid concentration required to produce cyclization corresponds to about 60 per cent sulfuric acid. Obviously these agents cannot be used in the present process.

My process can be applied to all of the natural rubber latices as well as to the cyclization of artificial latices of all unsaturated synthetic rubbers which are capable of being cyclized. This includes all rubbers which are polymers or copolymers of conjugated dienes, such as those prepared by the polymerization of 1,3-butadiene alone or copolymerized with other polymerizable monomers, such as styrene, vinyl naphthalene, the alpha methylene carboxylic acids and their esters, the nitriles, such as acrylonitrile, amides of acrylic acid, methyl acrylate, methyl methacrylate, methacrylonitrile, methacrylamide, isobutylene, methyl vinyl ether and the like. Several artificial latices prepared from these synthetic unsaturated rubbers have appeared on the market having dry rubber contents within the range of from about 30 to 65%. The rubber in these products can be cyclized by my process. This process is applicable to all aqueous dispersions of unsaturated rubbers with the particles in some cases being flocculated or in the form of a wet coagulum.

It is evident that there are numerous factors which will influence conditions for the most satisfactory operation of the present invention, the actual limits of which cannot be established except by a detailed study of each set of starting materials and the intermediate and finished products involved.

The term "cyclized rubber" is understood to mean and include each cyclized product of the operation of this invention having the same ratio of carbon and hydrogen as the rubber from which it was prepared but with a decreased unsaturation as compared with such rubber.

The introduction of sulfuric acid into a stabilized rubber latex first produces a certain acid concentration in the aqueous phase depending upon the strength of the acid used and the rate of its addition. The stronger the acid the slower it should be added since coagulation and over heating may be produced by the too rapid addition of oleum, for example. During the addition of the acid the reaction mixture should be agitated to maintain a uniform temperature throughout, with adequate cooling to prevent the temperature from rising too high. The reaction time may vary from about 30 minutes to over 10 hours depending upon the starting materials, the reaction conditions and the degree of cyclization required. An extended cyclization at higher temperatures may cause the cyclized rubber to be precipitated in a finely divided condition.

After the cyclizing agent reaches a minimum concentration of approximately 60 per cent by weight it begins to react with the rubber globules in the latex, with the rate of reaction depending upon the pressure and temperature at which the reaction mixture is maintained. With an acid concentration of about 90 per cent, for example, cyclization requires over 24 hours at room temperatures whereas a concentration of 60 per cent requires an operating temperature of at least 100° C. if the time of reaction is to be held to a reasonable figure. The practical range of acid concentrations is from about 60 to 90 per cent by weight with temperatures ranging correspondingly from about 120° to 50° C. Temperatures above 140° C. cannot be employed since carbonization is likely to occur at such temperatures. The factors of time, pressure and temperature may be maintained for any desired cycle of operation or changed at any time during the operation of the process to obtain the desired degree of cyclization. The most practical operating periods are within the range of from about 30 minutes to 10 hours.

The proper operating conditions can be judged from the following table which gives the results obtained under different conditions:

| Percent $H_2SO_4$ Conc. | Temp. in °C. | Time in hours | Percent Unsaturatedness of product. Raw latex equals 100% |
|---|---|---|---|
| 75 | 70 | 10 | 33 |
| 75 | 80 | .5 | 25 |
| 75 | 90 | 2.5 | 20 |
| 75 | 100 | 1.5 | 12 |
| 77.5 | 70 | 3.5 | 30 |
| 80 | 70 | 2.5 | 26 |

The form in which the cyclized rubber is present in the dispersion is determined by the extent of agglomeration of the cyclized rubber particles. If any substantial agglomeration occurs, the agglomerates formed may be dispersed readily. The cyclized rubber latex produced in this process contains cyclized rubber particles which are usually dispersed in the same manner as the rubber particles in rubber latex. The cyclized rubber dispersion cannot be distinguished microscopically from the original rubber latex. Consequently all the purification methods applicable to the treatment of rubber latex are applicable for the treatment of cyclized emulsions.

Solid cyclized rubber can be recovered from the dispersion of cyclized rubber by precipitation, flocculation and/or sedimentation, combined, if desired, with centrifuging or other methods of treatment. The separation of solid cyclized rubber may be effected by the addition to the dispersion of a precipitant which may be an organic non-solvent, such as alcohol or toluene or in some instances, water. In contradistinction to most commercial cyclized rubber, the solid cyclized rubber recovered in this process is in a finely divided powder form.

My invention can be explained in greater detail by reference to the following specific examples which represent practical operating embodiments of my process.

*Example 1*

A natural rubber latex having a dry rubber content of 60% was stabilized by adding to 20 ml. thereof 10.5 ml. of a 6% solution of cetyl pyridinium bromide. 54 g. of concentrated sulfuric acid were added to the stabilized latex so that in the serum the acid concentration was 75%. The mixture was then maintained at a temperature of about 80° C. for about 2 hours, after which the reaction mixture was cooled and the cyclized rubber precipitated therefrom by the addition of alcohol followed by drying. 12 g. of an excellent grade of cyclized rubber were recovered in this manner.

*Example 2*

150 g. of 60% latex were mixed with 75 g. of water. Herein 6.4 g. of a 15% cetyltrimethylammonium bromide-solution (trade-mark Vulcastab T. M. of the I. C. I.) were poured while stirring. There was now 1¼% emulsifying agent calculated on the rubber. While cooling and stirring 420 g. of concentrated sulphuric acid were added, i. e. 75% calculated on the water phase. This mixture was maintained at 90° C. for two hours. The separation is effected by pouring out into the double quantity by weight of water of 90° C. and sucking off. 90 g. of cyclized rubber having an unsaturatedness of 20 are obtained.

*Example 3*

100 g. 60% latex were stabilized with a solution of 1.2 g. cetylpyridinium bromide (trade-mark Fixanol C of the I. C. I.) in 40 g. water. There was now 2% Fixanol C calculated on the rubber. 296 g. of concentrated sulphuric acid were added while cooling and stirring, so that the acid concentration in the water phase was 80%. This mixture was maintained at 70° C. and samples of ±140 g. were taken after ¼ hour, ¾ hour and 1½ hours. The cyclo rubber was separated off by pouring out the reaction mixture into the double quantity of boiling water. The products were dried. The unsaturatednesses were 45, 34 and 25 resp.

*Example 4*

20 g. 60% latex were stabilized with a solution of 1.2 g. N-diethyl amino-ethyl oleylamide methosulphate (trade-mark Sapamine M. S. of Ciba) in 8 g. water. There was now 10% of emulsifying agent calculated on the rubber. Hereto 37 g. of concentrated sulphuric acid were added while cooling and stirring. This mixture was maintained at 100° C. for 5 hours. After cooling the mixture was separated off by pouring out into 100 g. water and subsequent shaking with 30 g. of chloroform. The product was dried and thereupon the unsaturatedness was determined. This was 21.

The procedures used in the above examples can be applied to the cyclization of latices prepared from all unsaturated synthetic rubbers which are capable of being cyclized.

While I have described what I consider to be the most advantageous embodiments of my process it is evident, of course, that various modifications can be made in the specific procedures which have been described without departing from the purview of this invention. Thus, while it is possible to conduct my cyclizing process with diluted latices, it is more advantageous to employ latices having a concentration of at least 25 per cent rubber content. This is more economical in that there is a saving in cyclizing agent as well as stabilizing agent. When a rubber flocculate is used the dry rubber content of the aqueous dispersion may range up to about 80 per cent by weight.

The cyclorubber may be precipitated from the reaction mixture, the precipitate may be washed (in order to remove the sulphuric acid etc.) and the cyclorubber may then again be dispersed in water. In this manner a pure aqueous dispersion of cyclorubber is obtained.

The precipitated and purified solid cyclized rubber obtained in my process may be dried and used directly in powder form or the aqueous dispersion of cyclized rubber recovered in my process can be purified by any of the conventional methods used for purifying latex and then used as a cyclized rubber latex for industrial applications.

In order to modify the properties of the cyclized rubber latex and the cyclized rubber to be recovered therefrom, softeners (e. g. phthalate), plasticizers, stabilizers, active or inert fillers, vulcanization ingredients, pigments and the like can be added to the original rubber latex, the cyclized rubber dispersion or the solid cyclized rubber.

The cyclized rubber may be vulcanized with materials, such as sulfur, sulfides, $S_2Cl_2$, $KSO_3Cl_2$ and $SO_2Cl_2$ The cyclized rubber in the aqueous dispersion may be vulcanized before its separation therefrom by the use of vulcanizers which are not affected adversely by the acidity of the dispersion.

The cyclized rubber product is suitable as an adhesive and as an insulating material. The addition of cyclized rubber to synthetic or natural rubber can improve various properties of the vulcanization. Cyclized rubber can be used also as a substitute for gutta-percha in the manufacture of golf balls. Cyclized rubber may be used in the manufacture of water-proof paper. Cyclized rubber can be used also in the manufacture of paints and lacquers, since a solution of cyclized rubber may be evaporated to give a glossy film which hardens on exposure to air.

Other modifications of my invention which fall within the scope of the following claims will be immediately evident to those skilled in the art.

What I claim is:

1. In the manufacture of cyclized rubber, the process which comprises adding to an aqueous latex of an unsaturated rubber capable of being cyclized and selected from the class consisting of natural rubber and the synthetic rubbery homopolymers and copolymers of conjugated diolefin hydrocarbons, a small amount of a cationic surface-active agent capable of stabilizing the latex in the presence of concentrated sulfuric acid and having a formula selected from the group consisting of

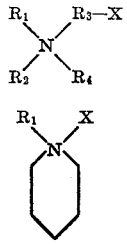

and wherein $R_1$ is a member of the group consisting of the alkyl, alkylol, aralkyl and aryl-alkylol radicals containing more than 12 carbon atoms; $R_2$, $R_3$ and $R_4$ are members of the group consisting of hydrogen and the lower alkyl, aralkyl, aryl and heterocyclic radicals, while X is a member of the group consisting of the anions of water-soluble acids; adding sufficient strong sulfuric acid to produce an acid concentration within the range of from about 60 to 90 per cent by weight and heating the mixture at reaction temperatures below about 140° C. for a period of from about 30 minutes to 10 hours to cyclize the rubber, whereby a dispersion of finely-divided cyclized rubber is obtained.

2. The process of claim 1 wherein the latex has a concentration of rubber within the range of from about 25 to 80 per cent by weight.

3. The process of claim 1 wherein the cyclizing temperature employed is within the range of from about 50° to 120° C.

4. The process of claim 1 wherein the surface-active agent is added in the amount of from about 1.5 to 10 per cent based on the dry rubber content.

5. The process of claim 1 wherein the surface active agent is selected from a class consisting of cetyl pyridinium bromide and chloride.

6. The process of claim 1 wherein the cyclo-rubber is precipitated from the reaction mixture, the precipitate is washed and the cyclorubber so obtained is then again dispersed in water.

GERARDUS JOHANNES van VEERSEN.

References Cited in the file of this patent

UNITED STATES PATENTS

| Number | Name | Date |
|---|---|---|
| 1,853,334 | Bruson | Apr. 12, 1932 |
| 2,005,320 | Konrad et al. | June 18, 1935 |
| 2,040,460 | Becker et al. | May 12, 1936 |
| 2,046,015 | Bunbury et al. | June 30, 1936 |
| 2,265,324 | Spence | Dec. 9, 1941 |
| 2,536,789 | Van Amerongen | Jan. 2, 1951 |
| 2,555,068 | Van Veersen | May 2, 1951 |